Sept. 19, 1950     H. F. M. REIJNS     2,522,839
PROJECTOR-DRAWING APPARATUS
Filed Nov. 28, 1947
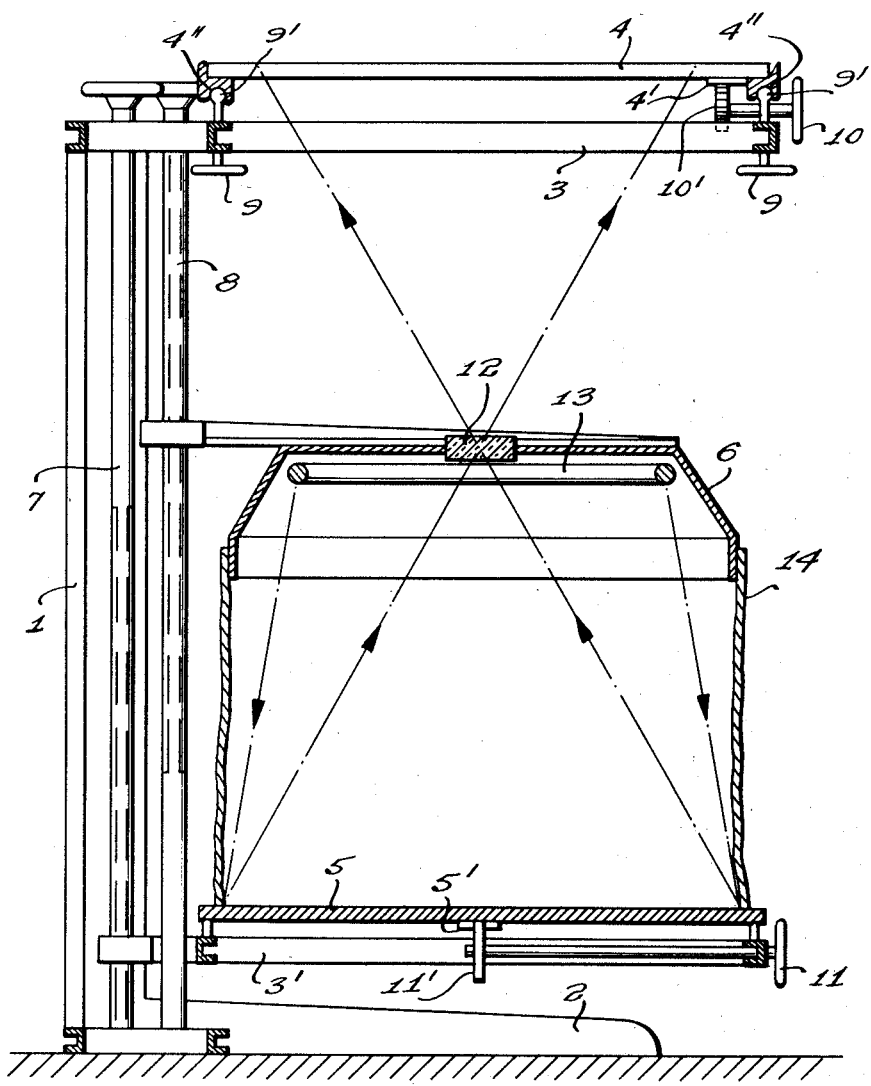
INVENTOR.

Patented Sept. 19, 1950

2,522,839

UNITED STATES PATENT OFFICE 2,522,839

PROJECTOR-DRAWING APPARATUS

Hermanus Franciscus Maria Reijns, Rotterdam, Netherlands, assignor to Algemeen Technischen Industrieel Bureau de Erven Jac. W. Rijns, Heerlen, Netherlands Application November 28, 1947, Serial No. 788,464
In the Netherlands May 1, 1941

Section 1, Public Law 690, August 8, 1946
Patent expires May 1, 1961

2 Claims. (Cl. 88—24)

The present invention relates to a projection drawing apparatus comprising a first table for carrying the drawings to be reproduced and a second table for carrying the drawing paper.

It is an object of the invention to provide a projection drawing apparatus with which it is possible to correct angular errors of the drawings to be reproduced.

It is another object of the invention to provide a projection drawing apparatus which is sturdy and simple in construction.

A projection drawing apparatus according to the invention comprises a first table for carrying the drawings to be reproduced, a second table for carrying the drawing paper arranged substantially parallel to the first table, a lens system arranged between the tables, means for moving one of the tables in a plane substantially parallel to the other of the tables, means for tilting the same table relative to the other of the tables, and means for moving one of the tables towards and away from the other.

A preferred embodiment of the invention includes means for moving the lens system between the tables.

The invention is, in a preferred form, illustrated in the drawing, and thereafter more precisely described.

With 1 is indicated the frame, which is provided with a stand 2. At the upper side there is a fixed support 3 for the transparent drawing table 4, which can for example be made of glass.

At the lower side there is a support 3' for the lower table 5 carrying the original to be reproduced, which support can be displaced in a vertical direction. Between both tables a lighting hood 6 is arranged, which is also movable in a vertical direction. Under this hood provided with a lens 12 a lighting tube 13 is situated, the radiation of which is limited by means of a curtain 14. The vertical displacement of the lower table 5 required for the adjustment takes place by turning the screw spindle 7 and the vertical displacement of the lighting hood 6 takes place by turning the screw spindle 8.

The drawing table can be displaced in its own plane in a lateral direction by means of a handwheel 10 with a driving wheel 10', which cooperates with a toothed rack 4' provided at the table 4. Moreover the table 4 can be brought to any angular position with regard to the lower table 5 by means of the set screws 9.

The heads 9' of these screws are arranged in grooves 4" of the table 4, so that the latter can be displaced in a lateral direction.

The lower table 5 can be moved in a lateral direction by means of the handwheel 11.

In order to enable a displacement of the tables in a horizontal direction, which is especially important for the lower table, the toothed rack such as 5' provided on the lower side of table 5 and cooperating with the wheel 11' driven by the handwheel 11 may be broad and displaceable over the corresponding wheel.

If on the side of the lower table a corresponding construction including a hand wheel and a driving wheel is provided, which cooperates with a toothed rack being broad and situated normally to the first one, the lower table can be displaced in any direction in the horizontal plane.

The apparatus according to the invention is very simple and efficient and makes it possible to work rapidly and faultlessly.

I claim:

1. Projection drawing apparatus comprising in combination a first table for carrying the drawings to be reproduced; a second table for carrying the drawing paper arranged substantially parallel to said first table; a lens system arranged between said tables; means for moving one of said tables in a plane substantially parallel to the other of said tables; means for tilting the same table relative to the other of said tables; and means for moving one of said tables towards and away from the other.

2. Projection drawing apparatus comprising in combination a first table for carrying the drawings to be reproduced; a second table for carrying the drawing paper arranged substantially parallel to said first table; a lens system arranged between said tables; means for moving one of said tables in a plane substantially parallel to the other of said tables; means for tilting the same table relative to the other of said tables; means for moving one of said tables towards and away from the other; and means for moving said lens system between said tables.

HERMANUS FRANCISCUS MARIA REIJNS.

REFERENCES CITED

The following references are of record in the file of this patent:

UNITED STATES PATENTS

| Number | Name | Date |
|---|---|---|
| 1,199,942 | Taylor | Oct. 3, 1916 |
| 1,306,861 | Sparkes | June 17, 1919 |
| 1,889,042 | Barr | Nov. 29, 1932 |
| 1,911,142 | Cahill | May 23, 1933 |
| 2,090,270 | Swanson | Aug. 17, 1937 |
| 2,186,330 | Fitzgerald | Jan. 9, 1940 |
| 2,341,042 | Hill | Feb. 8, 1944 |
| 2,411,514 | Blanc | Nov. 26, 1946 |